US012311815B2

(12) United States Patent
Mo (10) Patent No.: US 12,311,815 B2
(45) Date of Patent: May 27, 2025

(54) CHILD SAFETY SEAT AND SIDE COLLISION PROTECTION MECHANISM THEREOF (71) Applicant: BAMBINO PREZIOSO SWITZERLAND AG, Steinhausen (CH)

(72) Inventor: Xiaolong Mo, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 73 days.

(21) Appl. No.: 18/010,996

(22) PCT Filed: Jun. 16, 2021

(86) PCT No.: PCT/EP2021/066322
§ 371 (c)(1),
(2) Date: Dec. 16, 2022

(87) PCT Pub. No.: WO2021/255133
PCT Pub. Date: Dec. 23, 2021

(65) Prior Publication Data
US 2023/0271535 A1 Aug. 31, 2023

(30) Foreign Application Priority Data
Jun. 19, 2020 (CN) .......................... 202010571212.0

(51) Int. Cl.
B60N 2/28 (2006.01)
(52) U.S. Cl.
CPC ......... B60N 2/2884 (2013.01); B60N 2/2827 (2013.01)
(58) Field of Classification Search
CPC ........................... B60N 2/2884; B60N 2/2872
See application file for complete search history.

(56) References Cited

U.S. PATENT DOCUMENTS 3,829,158 A    8/1974  O'Connor
4,685,741 A    8/1987  Tsuge et al.
               (Continued)

FOREIGN PATENT DOCUMENTS

AU    2018217211 A1      2/2019
CA       3077919 A1  *  10/2010  ........... B60N 2/2803
                        (Continued)

OTHER PUBLICATIONS

CN Office Action; CN Application No. 2020105712120; Date Mailed: Dec. 15, 2023; pp. 1-6.
(Continued)

Primary Examiner — Timothy J Brindley
(74) Attorney, Agent, or Firm — CANTOR COLBURN LLP (57) ABSTRACT A side collision protection mechanism includes a side collision protection case pivotally connected to a side region of a child safety seat and a locking element movably set in the side collision protection case and having a locking end detachably locked to the side region. The locking end is fully locked to the side region when the side collision protection case is in an extended state and subjected to a side impact force, or partially locked to the side region when the side collision protection case is in the extended state but not subjected to any side impact force. The side collision protection case can be pushed pivotally relative to the side region to switch from the extended state to a folded state and to release the locking end from its locking to the side region. A child safety seat with the above side collision protection mechanism is also disclosed.

20 Claims, 6 Drawing Sheets

(56) References Cited

U.S. PATENT DOCUMENTS

| | | |
|---|---|---|
| 5,800,012 A | 9/1998 | Ziegler |
| 6,126,233 A | 10/2000 | Gaetano et al. |
| 6,196,629 B1 | 3/2001 | Onishi et al. |
| 6,428,099 B1 | 8/2002 | Kain |
| 7,246,854 B2 | 7/2007 | Dingman et al. |
| 8,007,043 B1 | 8/2011 | Vuong |
| 8,449,030 B2 | 5/2013 | Powell et al. |
| 8,490,757 B2 | 7/2013 | Chen et al. |
| 8,684,456 B2 | 4/2014 | Powell |
| 9,475,411 B2 | 10/2016 | Gagnade |
| 9,610,868 B2 | 4/2017 | Zhang |
| 9,908,444 B2 | 3/2018 | Haas et al. |
| 10,414,297 B2 | 9/2019 | Pos |
| 10,427,558 B1 | 10/2019 | Dickens |
| RE47,971 E | 5/2020 | Tanner et al. |
| 10,780,857 B1 | 9/2020 | Rajasingham |
| 10,857,968 B2 | 12/2020 | Chen |
| 10,933,779 B2 * | 3/2021 | Cui ................ B60N 2/2812 |
| 10,994,689 B2 | 5/2021 | Chi et al. |
| 11,358,500 B2 | 6/2022 | Cui |
| 11,560,073 B2 | 1/2023 | Pos |
| 11,691,544 B2 | 7/2023 | Cui |
| 11,865,953 B2 * | 1/2024 | Zhang ................ B60N 2/2884 |
| 2001/0011838 A1 | 8/2001 | Kassai et al. |
| 2001/0039696 A1 | 11/2001 | Maciejczyk |
| 2003/0151282 A1 | 8/2003 | Williams et al. |
| 2004/0124677 A1 | 7/2004 | Meeker et al. |
| 2004/0164529 A1 | 8/2004 | Yoshida |
| 2004/0189068 A1 | 9/2004 | Meeker et al. |
| 2004/0195815 A1 | 10/2004 | Browne et al. |
| 2004/0251721 A1 | 12/2004 | Yoshida |
| 2005/0030188 A1 | 2/2005 | Flanagan et al. |
| 2005/0104384 A1 | 5/2005 | Kondo et al. |
| 2006/0138844 A1 | 6/2006 | Lavoie et al. |
| 2006/0208543 A1 | 9/2006 | Spence et al. |
| 2007/0057545 A1 | 3/2007 | Hartenstine et al. |
| 2007/0216203 A1 | 9/2007 | Rajasingham |
| 2007/0284925 A1 | 12/2007 | Balensiefer |
| 2009/0015044 A1 | 1/2009 | Marsilio et al. |
| 2009/0179470 A1 | 7/2009 | Bass |
| 2009/0218858 A1 | 9/2009 | Lawall et al. |
| 2009/0322131 A1 | 12/2009 | Hartenstine et al. |
| 2010/0007184 A1 | 1/2010 | Griffin et al. |
| 2010/0026059 A1 | 2/2010 | Amirault et al. |
| 2010/0032997 A1 | 2/2010 | Gold et al. |
| 2010/0171349 A1 | 7/2010 | Dellanno |
| 2010/0194158 A1 | 8/2010 | Mahal et al. |
| 2010/0231012 A1 | 9/2010 | Marsden et al. |
| 2010/0301645 A1 | 12/2010 | Uwnawich |
| 2011/0012398 A1 | 1/2011 | Powell et al. |
| 2011/0012406 A1 | 1/2011 | Gibson et al. |
| 2011/0252566 A1 | 10/2011 | Rumack |
| 2012/0007408 A1 | 1/2012 | Freienstein et al. |
| 2012/0031714 A1 | 2/2012 | Chen et al. |
| 2012/0242129 A1 | 9/2012 | Gaudreau, Jr. et al. |
| 2012/0326476 A1 | 12/2012 | Runk et al. |
| 2013/0062917 A1 | 3/2013 | Powell |
| 2013/0082498 A1 | 4/2013 | Doolan, III |
| 2013/0154318 A1 | 6/2013 | Van Der Veer et al. |
| 2013/0320725 A1 | 12/2013 | Conway |
| 2014/0070597 A1 | 3/2014 | Powell et al. |
| 2014/0117729 A1 | 5/2014 | Allen et al. |
| 2014/0246889 A1 | 9/2014 | Strong et al. |
| 2015/0021962 A1 | 1/2015 | Gagnade |
| 2015/0091344 A1 | 4/2015 | Tanner et al. |
| 2015/0336482 A1 * | 11/2015 | Pos ................ B60N 2/2845 |
| | | 297/250.1 |
| 2015/0375641 A1 | 12/2015 | Van Mourik et al. |
| 2016/0152164 A1 | 6/2016 | Hass et al. |
| 2016/0221480 A1 | 8/2016 | Shellenberger |
| 2017/0057384 A1 | 3/2017 | Pleiman et al. |
| 2017/0101055 A1 | 4/2017 | Alfaro Fonseca |
| 2017/0106772 A1 | 4/2017 | Williams et al. |
| 2017/0129370 A1 | 5/2017 | Chen et al. |
| 2017/0151894 A1 | 6/2017 | McRoberts et al. |
| 2017/0203672 A1 | 7/2017 | Johnson et al. |
| 2017/0349065 A1 | 12/2017 | Pleiman et al. |
| 2018/0361888 A1 | 12/2018 | Campbell et al. |
| 2019/0070984 A1 | 3/2019 | Schmitz et al. |
| 2019/0176746 A1 | 6/2019 | Chen |
| 2019/0193606 A1 | 6/2019 | Cohen et al. |
| 2019/0241141 A1 | 8/2019 | Sirous |
| 2020/0101876 A1 * | 4/2020 | Cui ................ B60N 2/2812 |
| 2020/0156515 A1 | 5/2020 | Mizuno et al. |
| 2020/0223333 A1 | 7/2020 | Mason et al. |
| 2020/0290489 A1 | 9/2020 | Stacey |
| 2020/0298732 A1 | 9/2020 | Gandhi et al. |
| 2020/0339016 A1 | 10/2020 | Zhang |
| 2020/0384900 A1 | 12/2020 | Thurn et al. |
| 2021/0016692 A1 | 1/2021 | Guo |
| 2021/0070246 A1 | 3/2021 | Chen |
| 2021/0078464 A1 | 3/2021 | Gaudreau, Jr. et al. |
| 2021/0146809 A1 | 5/2021 | Cui |
| 2021/0229578 A1 | 7/2021 | Peleska et al. |
| 2021/0284049 A1 * | 9/2021 | Mo ................ B60N 2/2872 |
| 2021/0300216 A1 | 9/2021 | Urrea et al. |
| 2021/0331614 A1 | 10/2021 | Di Censo et al. |
| 2021/0402894 A1 | 12/2021 | Zeng |
| 2022/0032825 A1 | 2/2022 | Dinescu et al. |
| 2022/0055505 A1 | 2/2022 | Guo |
| 2022/0097576 A1 * | 3/2022 | Zhang ................ B60N 2/2872 |
| 2022/0097577 A1 | 3/2022 | Thenander et al. |
| 2022/0111776 A1 * | 4/2022 | Mo ................ B60N 2/286 |
| 2022/0126732 A1 * | 4/2022 | Zhang ................ B60N 2/4235 |
| 2022/0144168 A1 | 5/2022 | Ito et al. |
| 2022/0265065 A1 | 8/2022 | Kzaiz et al. |
| 2022/0305974 A1 | 9/2022 | Hsu et al. |
| 2022/0340817 A1 | 10/2022 | Kou et al. |
| 2022/0371483 A1 | 11/2022 | Hasan et al. |
| 2023/0202368 A1 | 6/2023 | Zhang |
| 2023/0211709 A1 | 7/2023 | Chen |
| 2023/0234480 A1 | 7/2023 | Keegan et al. |
| 2023/0242016 A1 | 8/2023 | Mo et al. |
| 2023/0286423 A1 | 9/2023 | Chen |
| 2023/0339373 A1 | 10/2023 | Mo et al. |
| 2023/0365033 A1 | 11/2023 | Vibhuti et al. |
| 2024/0010106 A1 | 1/2024 | Mo et al. |

FOREIGN PATENT DOCUMENTS

| | | | |
|---|---|---|---|
| CN | 102271962 A | 12/2011 | |
| CN | 102343928 A | 2/2012 | |
| CN | 103072497 A | 5/2013 | |
| CN | 104169126 A | 11/2014 | |
| CN | 104602952 A | 5/2015 | |
| CN | 105329121 A | 2/2016 | |
| CN | 105774888 A | 7/2016 | |
| CN | 105882467 A | 8/2016 | |
| CN | 107199923 A | 9/2017 | |
| CN | 206841219 U | 1/2018 | |
| CN | 206914178 U | 1/2018 | |
| CN | 207190848 U | 4/2018 | |
| CN | 207190853 U | 4/2018 | |
| CN | 108025661 A | 5/2018 | |
| CN | 207360133 U | 5/2018 | |
| CN | 108437860 A | 8/2018 | |
| CN | 108790970 A * | 11/2018 | ........ B60N 2/2884 |
| CN | 109131517 A | 1/2019 | |
| CN | 109895664 A | 6/2019 | |
| CN | 109927594 A | 6/2019 | |
| CN | 209141947 U | 7/2019 | |
| CN | 110126773 A | 8/2019 | |
| CN | 110254303 A * | 9/2019 | |
| CN | 110271464 A | 9/2019 | |
| CN | 110497826 A | 11/2019 | |
| CN | 110588461 A | 12/2019 | |
| CN | 110641330 A | 1/2020 | |
| CN | 110901483 A | 3/2020 | |
| CN | 110936864 A | 3/2020 | |
| CN | 110962709 A | 4/2020 | |
| CN | 116080495 A | 5/2023 | |
| CN | 116080496 A * | 5/2023 | |
| DE | 9218775 U1 | 9/1995 | |
| DE | 19723345 C1 | 7/1998 | |

(56) References Cited

FOREIGN PATENT DOCUMENTS

| | | |
|---|---|---|
| DE | 202012102223 U1 | 7/2012 |
| DE | 202015104791 U1 | 11/2015 |
| DE | 102015214910 A1 | 2/2016 |
| DE | 102015113836 A1 | 2/2017 |
| DE | 102021128940 A1 | 8/2022 |
| EP | 0049680 A1 | 4/1982 |
| EP | 0276186 A1 | 7/1988 |
| EP | 1452406 A1 | 9/2004 |
| EP | 2275303 A1 | 1/2011 |
| EP | 2368752 A2 | 9/2011 |
| EP | 2746097 A1 | 6/2014 |
| EP | 3162623 A1 | 5/2017 |
| EP | 2433832 B1 | 10/2018 |
| EP | 3495196 A1 | 6/2019 |
| EP | 3738819 A1 * 11/2020 ........... B60N 2/2803 |
| GB | 2338181 A | 12/1999 |
| GB | 2531121 A | 4/2016 |
| GB | 2536124 A | 9/2016 |
| GB | 2555914 A | 5/2018 |
| GB | 2575642 A | 1/2020 |
| GB | 2598264 B | 7/2022 |
| JP | H05034963 U | 5/1993 |
| JP | H07117542 A | 5/1995 |
| JP | 2561307 Y2 | 1/1998 |
| JP | 2002240603 A | 8/2002 |
| JP | 2005022596 A | 1/2005 |
| JP | 2007091200 A | 4/2007 |
| JP | 2013256289 A | 12/2013 |
| JP | 2015086655 A | 5/2015 |
| JP | 3198273 U | 6/2015 |
| JP | 2018526279 A | 9/2018 |
| TW | 200711897 A | 4/2007 |
| TW | 201605668 A | 2/2016 |
| TW | 202200418 A | 1/2022 |
| WO | 2005108153 A2 | 11/2005 |
| WO | 2005108153 A3 | 3/2007 |
| WO | 2015002412 A1 | 1/2015 |
| WO | 2017029272 A1 | 2/2017 |
| WO | 2018109177 A1 | 6/2018 |
| WO | 2019034018 A1 | 2/2019 |
| WO | 2019091919 A1 | 5/2019 |
| WO | 2020058273 A1 | 3/2020 |
| WO | 2022162049 A1 | 8/2022 |
| WO | 2022219154 A1 | 10/2022 |
| WO | 2022263837 A1 | 12/2022 |
| WO | WO-2023222920 A2 * 11/2023 ............. B60N 2/002 |
| WO | 2024112607 A1 | 5/2024 |

OTHER PUBLICATIONS

CN Office Action; CN Application No. 2020105712120; Date Mailed: May 8, 2024; pp. 1-8.
JP Notice of Reasons for Refusal; JP Application No. 2022577733; Date Mailed: Mar. 11, 2024; pp. 1-7.
PCT International Search Report; International Application No. PCT/EP2021/066322; International Filing Date: Jun. 16, 2021; Date Mailed: Oct. 20, 2021; pp. 1-3.
PCT ISR Written Opinion; International Application No. PCT/EP2021/066322; International Filing Date: Jun. 16, 2021; Date Mailed: Oct. 20, 2021; pp. 1-5.
Taiwanese Patent No. 110121676-1st Office Action—Nov. 17, 2021, pp. 1-3.
International Search Report for International Application No. PCT/US2024/036105; International Filing Date: Jun. 28, 2024; Date of Mailing: Dec. 10, 2024; 6 pages.
Written Opinion for International Application No. PCT/US2024/036105; International Filing Date: Jun. 28, 2024; Date of Mailing: Dec. 10, 2024; 31 pages.
Chinese Application No. 2020106176421; Notice of Allowance dated Apr. 21, 2024; 7 pgs.
Chinese Application No. 2020106176421—1st Office Action—Nov. 16, 2023, pp. 1-9.
Chinese Application No. 202323141561.7; Office Action dated Jun. 14, 2024; 4 pages.
Chinese Office Action for Chinese Application No. 202010177261.6; Report Mail Date Jun. 3, 2023; pp. 1-36 with Machine Translation.
International Search Report & Written Opinion for International Application No. PCT/EP2023/055760; International Filing Date: Mar. 7, 2023; Date of Mailing: Jun. 1, 2023; 11 pages.
International Search Report for International Application No. PCT/US2023/080375; International Filing Date: Nov. 17, 2023; Date of Mailing: Apr. 5, 2024; 4 pages.
International Search Report for International Application No. PCT/US2023/080376; International Filing Date: Nov. 17, 2023; Date of Mailing: Mar. 27, 2024; 5 pages.
International Search Report for International Application No. PCT/US2024/029959; International Filing Date: May 17, 2024; Date of Mailing: Oct. 30, 2024; 5 pages.
Invitation To Pay Additional Fees for International Application No. OCT/US2024/036105; International Filing Date: Jun. 28, 2024; Date of Mailing: Sep. 20, 2024; 3 pages.
Invitation To Pay Additional Fees for International Application No. PCT/US2023/080376; International Filing Date: Nov. 17, 2023; Date of Mailing: Jan. 26, 2024; 2 pages.
Invitation To Pay Additional Fees for International Application No. PCT/US2024/029959; International Filing Date: May 17, 2024; Date of Mailing: Jul. 30, 2024; 2 pages.
Invitation To Pay Additional Fees for International Application No. PCT/US2024/036079; International Filing Date: Jun. 28, 2024; Date of Mailing: Sep. 20, 2024; 3 pages.
Invitation To Pay Additional Fees for International Application No. PCT/US2024/037376; International Filing Date: Jul. 10, 2024; Date of Mailing: Sep. 10, 2024; 3 pages.
Japanese Application No. 2022-580988—1st Office Action with English translation—Feb. 5, 2024, pp. 1-16.
Li Tianjing, Yancheng Industrial Vocational and Technical College, "Structural Design of Multifunctional Child Safety Seat," China Academic Journal Electronic Publishing House, with english abstract, DOI: 10.15989/http://www.cnki.net; Apr. 10, 2019; pp. 1-5.
PCT International Search Report and Written Opinion; International Application No. PCT/EP2021/068021; International Filing Date: Jun. 30, 2021; Date Mailed: Sep. 14, 2021; pp. 1-9.
Taiwanese Application No. 11221283830; Office Action dated Dec. 21, 2023; 22 pages.
Taiwanese Patent No. 110123675—1st Office Action—Nov. 7, 2021, pp. 1-7.
U.S. Appl. No. 17/198,758; Final Office Action dated Oct. 28, 2022; 13 pages.
U.S. Appl. No. 17/198,758; Non-Final Office Action dated Apr. 1, 2022; 21 pages.
U.S. Appl. No. 18/013,855; Non-Final Office Action dated Aug. 20, 2024; 26 pages.
Written Opinion for International Application No. PCT/US2023/080375; International Filing Date: Nov. 17, 2023; Date of Mailing: Apr. 5, 2024; 6 pages.
Written Opinion for International Application No. PCT/US2023/080376; International Filing Date: Nov. 17, 2023; Date of Mailing: Mar. 27, 2024; 21 pages.
Written Opinion for International Application No. PCT/US2024/029959; International Filing Date: May 17, 2024; Date of Mailing: Oct. 30, 2024; 12 pages.
Invitiation To Pay Additional Fees for International Application No. PCT/US2024/046120; International Filing Date: Sep. 11, 2024; Date of Mailing: Nov. 29, 2024; 2 pages.
Invitiation To Pay Additional Fees for International Application No. PCT/US2024/046122; International Filing Date: Sep. 11, 2024; Date of Mailing: Nov. 29, 2024; 2 pages.
Invitiation To Pay Additional Fees for International Application No. PCT/US2024/048496; International Filing Date: Sep. 26, 2024; Date of Mailing: Nov. 29, 2024; 3 pages.
Invitiation To Pay Additional Fees for International Application No. PCT/US2024/048498; International Filing Date: Sep. 26, 2024; Date of Mailing: Dec. 3, 2024; 2 pages.

(56) References Cited

OTHER PUBLICATIONS

Invitiation To Pay Additional Fees for International Application No. PCT/US2024/048500; International Filing Date: Sep. 26, 2024; Date of Mailing: Dec. 3, 2024; 2 pages.
Invitation To Pay Additional Fees for International Application No. PCT/US2024/048501; International Filing Date: Sep. 26, 2024; Date of Mailing: Nov. 29, 2024; 2 pages.
International Search Report for International Application No. PCT/US2024/036079; International Filing Date: Jun. 28, 2024; Date of Mailing: Dec. 18, 2024; 5 pages.
International Search Report for International Application No. PCT/US2024/037376; International Filing Date: Jul. 10, 2024; Date of Mailing: Jan. 10, 2025; 4 pages.
International Search Report for International Application No. PCT/US2024/046120; International Filing Date: Sep. 11, 2024; Date of Mailing: Jan. 24, 2025; 5 pages.
International Search Report for International Application No. PCT/US2024/046122; International Filing Date: Sep. 11, 2024; Date of Mailing: Jan. 28, 2025; 5 pages.
International Search Report for International Application No. PCT/US2024/048498; International Filing Date: Sep. 26, 2024; Date of Mailing: Feb. 3, 2025; 5 pages.
International Search Report for International Application No. PCT/US2024/048500; International Filing Date: Sep. 26, 2024; Date of Mailing: Jan. 31, 2025; 5 pages.
International Search Report for International Application No. PCT/US2024/048501; International Filing Date: Sep. 26, 2024; Date of Mailing: Jan. 27, 2025; 5 pages.
International Search Report for International Application Np. PCT/US2024/057303; International Filing Date: Nov. 25, 2024; Date of Mailing: Feb. 13, 2025; 2 pages.
Written Opinion for International Application No. PCT/US2024/036079; International Filing Date: Jun. 28, 2024; Date of Mailing: Dec. 18, 2024; 24 pages.
Written Opinion for International Application No. PCT/US2024/037376; International Filing Date: Jul. 10, 2024; Date of Mailing: Jan. 10, 2025; 24 pages.
Written Opinion for International Application No. PCT/US2024/046120; International Filing Date: Sep. 11, 2024; Date of Mailing: Jan. 24, 2025; 12 pages.
Written Opinion for International Application No. PCT/US2024/046122; International Filing Date: Sep. 11, 2024; Date of Mailing: Jan. 28, 2025; 21 pages.
Written Opinion for International Application No. PCT/US2024/048498; International Filing Date: Sep. 26, 2024; Date of Mailing: Feb. 3, 2025; 46 pages.
Written Opinion for International Application No. PCT/US2024/048500; International Filing Date: Sep. 26, 2024; Date of Mailing: Jan. 31, 2025; 103 pages.
Written Opinion for International Application No. PCT/US2024/048501; International Filing Date: Sep. 26, 2024; Date of Mailing: Jan. 27, 2025; 15 pages.
Written Opinion for International Application Np. PCT/US2024/057303; International Filing Date: Nov. 25, 2024; Date of Mailing: Feb. 13, 2025; 6 pages.
International Search Report for International Application No. PCT/US2024/048496; International Filing Date: Sep. 26, 2023; Date of Mailing: Jan. 27, 2025; 6 pages.
Written Opinion for International Application No. PCT/US2024/048496; International Filing Date: Sep. 26, 2023; Date of Mailing: Jan. 27, 2025; 29 pages.
Taiwanese Application No. 113148294; Office Action with English translation dated Feb. 10, 2025; 34 pages.
Invitation To Pay Additional Fees for International Application No. PCT/US2025/018832; International Filing Date: Mar. 7, 2025; Date of Mailing: Apr. 25, 2025; 3 pages.
Invitation To Pay Additional Fees for International Application No. PCT/US2025/019359; International Filing Date: Mar. 11, 2025; Date of Mailing: Apr. 25, 2025; 3 pages.

* cited by examiner

CHILD SAFETY SEAT AND SIDE COLLISION PROTECTION MECHANISM THEREOF

CROSS REFERENCE TO RELATED APPLICATIONS

This application is a National Stage application of PCT/EP2021/066322, filed Jun. 16, 2021, which claims the benefit of Chinese Application No. 202010571212.0, filed Jun. 19, 2020, both of which are incorporated by reference in their entirety herein.

TECHNICAL FIELD

The present disclosure relates to the field of baby products, and in particular to a child safety seat and a side collision protection mechanism thereof.

BACKGROUND A child safety seat is mainly used on a car to protect the safety of a child riding in the car. Currently, the child safety seat has been widely applied. In our daily life, side collision often occurs during a car accident. To protect the child riding in the car against a side impact force during the side collision accident, various side collision protection mechanisms have been developed for mounting on side regions of the child safety seats.

SUMMARY

The side collision protection mechanism according to the present disclosure is provided on a child safety seat for buffering a side impact force applied to the child safety seat during a side collision accident. For this purpose, the side collision protection mechanism includes a side collision protection case and a locking element. The side collision protection case is pivotably connected to a side region of the child safety seat and can be switched between a folded state, in which the side collision protection case is flatly fitted on the side region, and an extended state, in which the side collision protection case is turned away from the side region. The side collision protection case is maintained in the extended state through a locking of the locking element to the side region. The locking element is movably set in the side collision protection case and has a locking end detachably engaged with the side region; the locking end is fully locked to the side region when the side collision protection case is in the extended state and subjected to a side impact force; and the locking end is partially locked to the side region when the side collision protection case is in the extended state but not subjected to any side impact force. In the latter case, the locking end can be released from its partial locking to the side region when the side collision protection case is pushed to pivotally turn relative to the side region to switch from the extended state into the folded state.

The child safety seat according to the present disclosure includes a seat, a base and the above-mentioned side collision protection mechanism. The seat is mounted on a top of the base; and the side collision protection case is pivotally connected to a side region of the seat or the base.

DETAILED DESCRIPTION

To facilitate understanding of the objects, characteristics and effects of this present disclosure, a preferred embodiment together with the attached drawings for the detailed description of the present disclosure are provided. It is noted the present disclosure can be implemented or applied in other embodiments, and many changes and modifications in the described embodiment can be carried out without departing from the spirit of the disclosure, and it is also understood that the preferred embodiment is only illustrative and not intended to limit the present disclosure in any way.

A currently available side collision protection mechanism generally includes unlocking operating means, a locking device and a side collision protection case. The conventional side collision protection case is sideward extended from the side region of the child safety seat when it is in a use state, and is flatly fitted on the side region of the child safety seat when it is not in use. When the conventional side collision protection case is in the use state, the unlocking operating means can be operated to control the unlocking of the locking device, so that the sideward extended conventional side collision protection case can be folded. Since the above described conventional side collision protection mechanism is complicated in structure, it is difficult to efficiently fold the conventional side collision protection mechanism when the same is not in use.

It is therefore desirable to overcome the above problems by providing an improved side collision protection mechanism having a simple structure and being easily and quickly foldable, and a child safety seat having the above improved side collision protection mechanism mounted thereon.

An objective of the present disclosure is to provide a side collision protection mechanism that has a simple structure and can be quickly and conveniently folded but can provide immediate protection to a child riding in a car during a side collision accident.

Another objective of the present disclosure is to provide a child safety seat having a side collision protection mechanism, and the side collision protection mechanism has a simple structure and can be quickly and conveniently folded when it is not in use but can provide immediate protection to a child riding in a car during a side collision accident.

Compared to the prior art, the locking end of the present disclosure is fully locked to the side region when the side collision protection case is in the extended state and subjected to a side impact force, such that the side collision protection case can stably maintain in the extended state and provide immediate protection to a user during a side collision accident to ensure a safety use thereof. On the other hand, the locking end is only partially locked to the side region when the side collision protection case is in the extended state but not subjected to any side impact force, in this case, an operator can simply manually pivotally push the side collision protection case relative to the side region to release the partial locking of the locking end from the side region completely without the necessity of operating any unlocking means, which effectively increases the speed of folding up the side collision protection case to facilitate convenient and quick folding procedure of the latter. Further, since the side collision protection mechanism does not include any unlocking means that needs an operator to operate, the side collision protection mechanism can have an effectively optimized and simplified structure.

Also, compared to the prior art, since the child safety seat according to the present disclosure includes the above-mentioned side collision protection mechanism, the locking end of the side collision protection case in the extended state is fully locked to the side region during a side collision accident to stably maintain the side collision protection case in the extended state, which enables the side collision protection mechanism to provide immediate protection to a child riding in a car during the side collision accident and ensures the safety use of the side collision protection mechanism. And, since the locking end of the side collision protection case in the extended state is not fully locked to the side region when there is not any side collision, the side collision protection case can be manually pushed pivotally relative to the side region to release the locking end from its partial locking to the side region completely without the need of operating any unlocking means, which effectively increases the speed of folding up the side collision protection mechanism to facilitate convenient and quick folding procedure of the latter. Further, since the side collision protection mechanism of the present disclosure does not include any unlocking means that needs an operator to operate, the side collision protection mechanism can have an effectively optimized and simplified structure.

Figure 1:
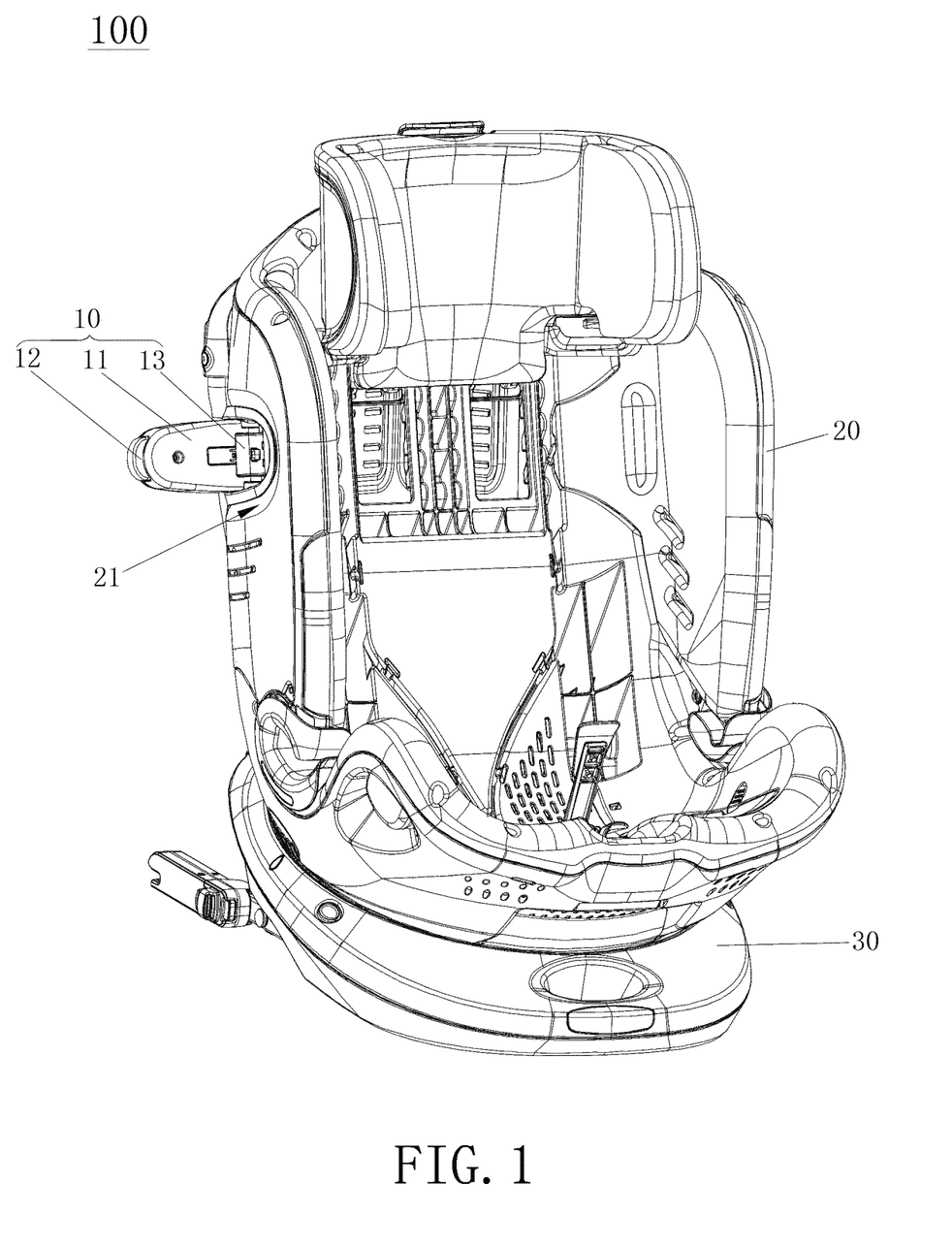
FIG. 1 is a perspective structural view of a child safety seat having a side collision protection mechanism according to the present disclosure with a side collision protection case of the side collision protection mechanism in an extended state.
Figure 2:
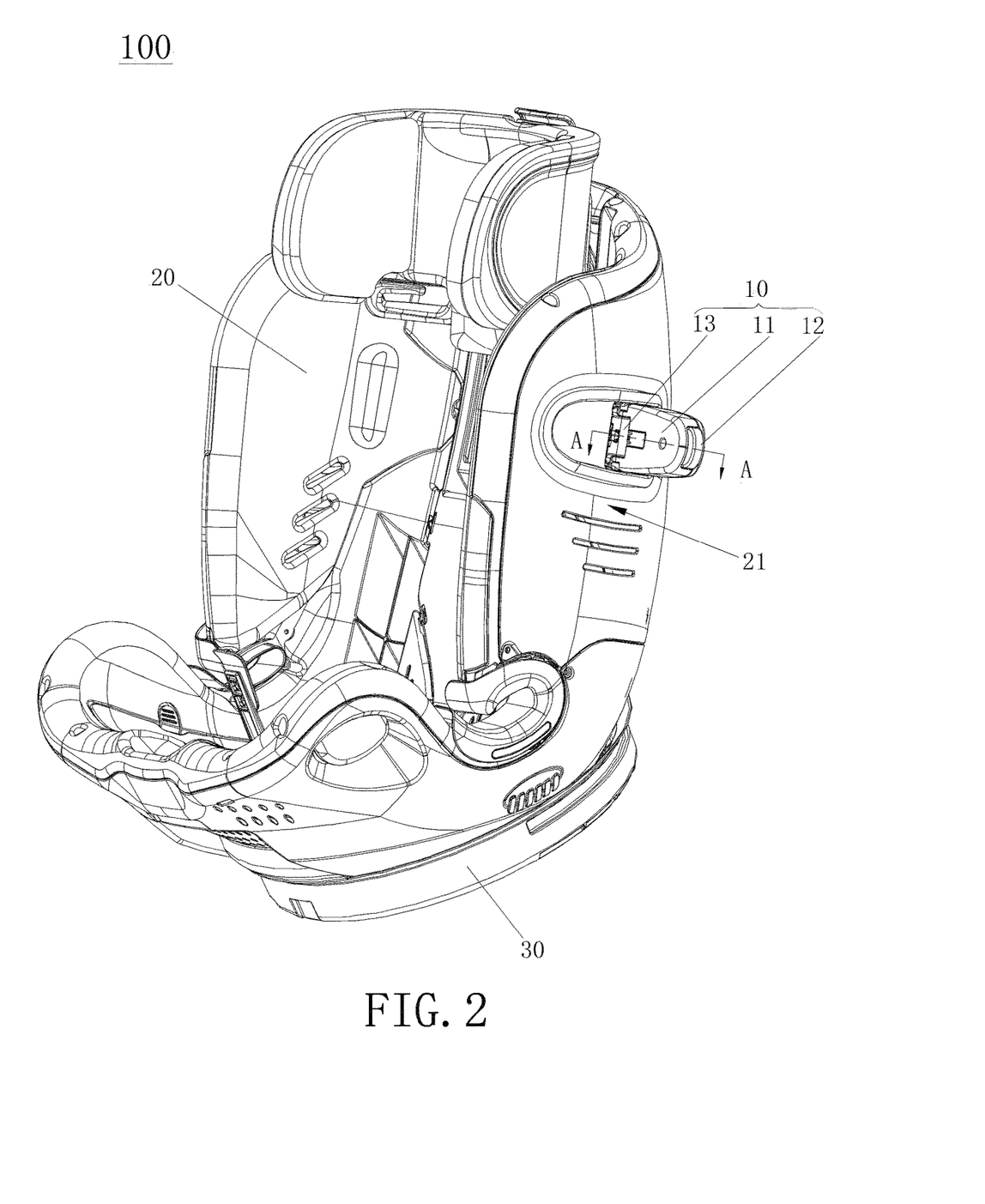
FIG. 2 is a further perspective structural view of the child safety seat of FIG. 1 viewed from another angle.
Figure 3:
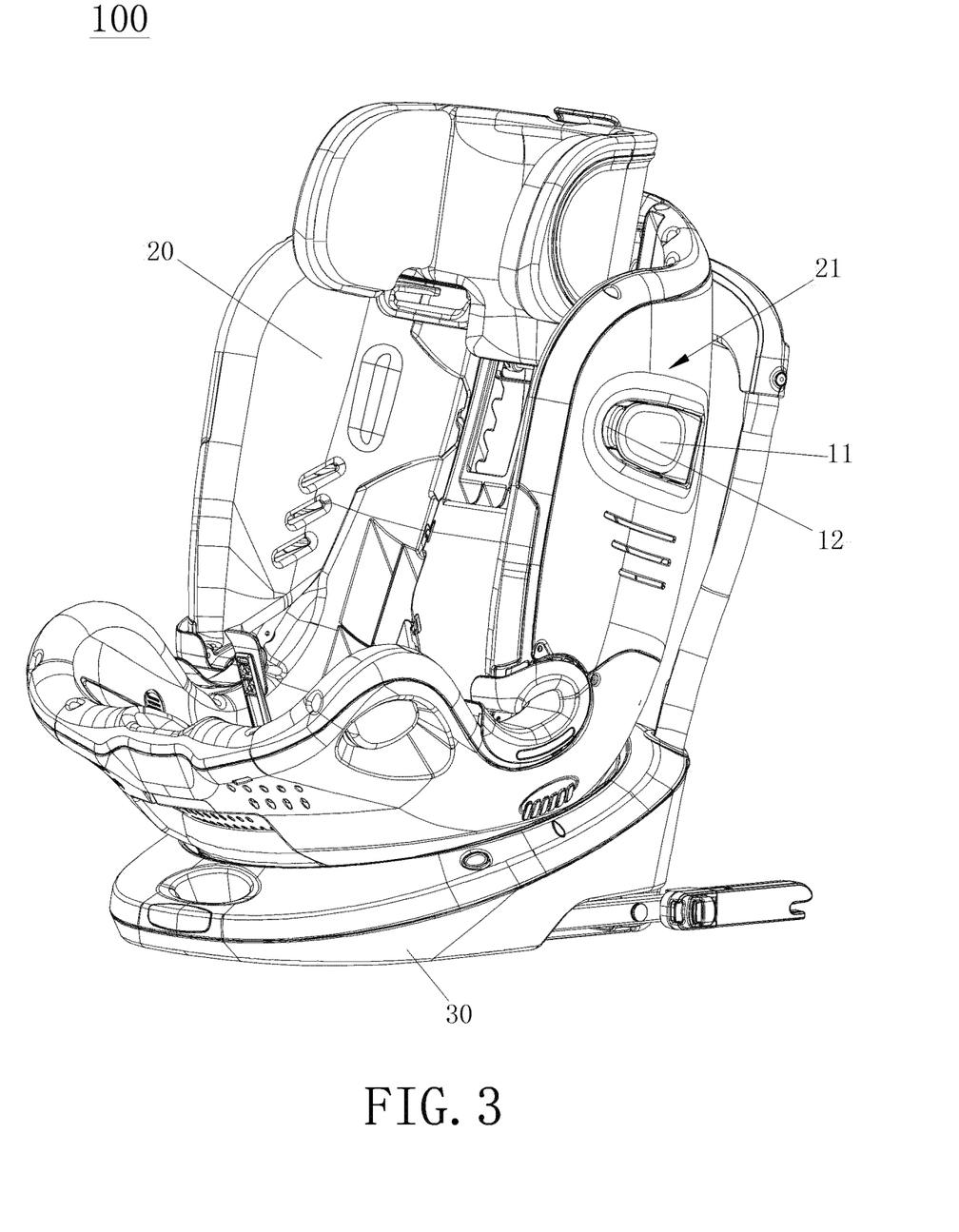
FIG. 3 is a perspective structural view of the child safety seat according to the present disclosure with the side collision protection case thereof in a folded state.

As shown in FIGS. 1 to 3, a child safety seat 100 according to the present disclosure includes a side collision protection mechanism 10, a seat 20 and a base 30. The seat 20 is mounted on a top of the base 30. The side collision protection mechanism 10 includes a side collision protection case 11, which will be described in detail below, pivotally connected to a side region 21 of the seat 20. Preferably, but not limited to, the side collision protection mechanism 10 is provided to each of two side regions 21 of the seat 20, so as to provide a completed buffering protection to a child sitting in the child safety seat 100. The side collision protection case 11 can be switched between a folded state, in which the side collision protection case 11 is flatly fitted on the side region 21 as shown in FIG. 3, and an extended state, in which the side collision protection case is pivotally turned away from the side region 21 as shown in FIGS. 1 and 2. When the child safety seat 100 is in use, the side collision protection case 11 is pivotally turned from the folded state into the extended state. When the child safety seat 100 with the side collision protection case 11 in the extended state is subjected to a side impact force during a side collision accident, the side impact force will first act on the side collision protection mechanism 10 instead of the child sitting in the child safety seat 100, and the side impact force will then be effectively guided out through the seat 20 or the base 30 and be buffered, providing a good protection to the child in the child safety seat 100. When the child safety seat 100 is not in use, the side collision protection case 11 can be pivotally turned into the folded state to flatly fit on the side region 21 and reduce the space occupied by it to facilitate convenient storage of the child safety seat 100. Depending on the actual need in use, the side collision protection case 11 can also be pivotally connected to a side region 21 at the base 30, so that the side collision protection mechanism 10 is adaptable to different mounting environments and provides more appropriate protection. The child safety seat 100 of the present disclosure may adopt a currently available safety seat structure, which is not repeatedly described herein. Of course, in addition to be applied to the above-mentioned child safety seat 100, the side collision protection mechanism 10 can also be applied to other types of baby and child carriers according to actual need without being particularly limited to any specific application. The side collision protection mechanism 10 is now described in more detail with reference to the accompanying FIGS. 1 to 6.

Figure 4:
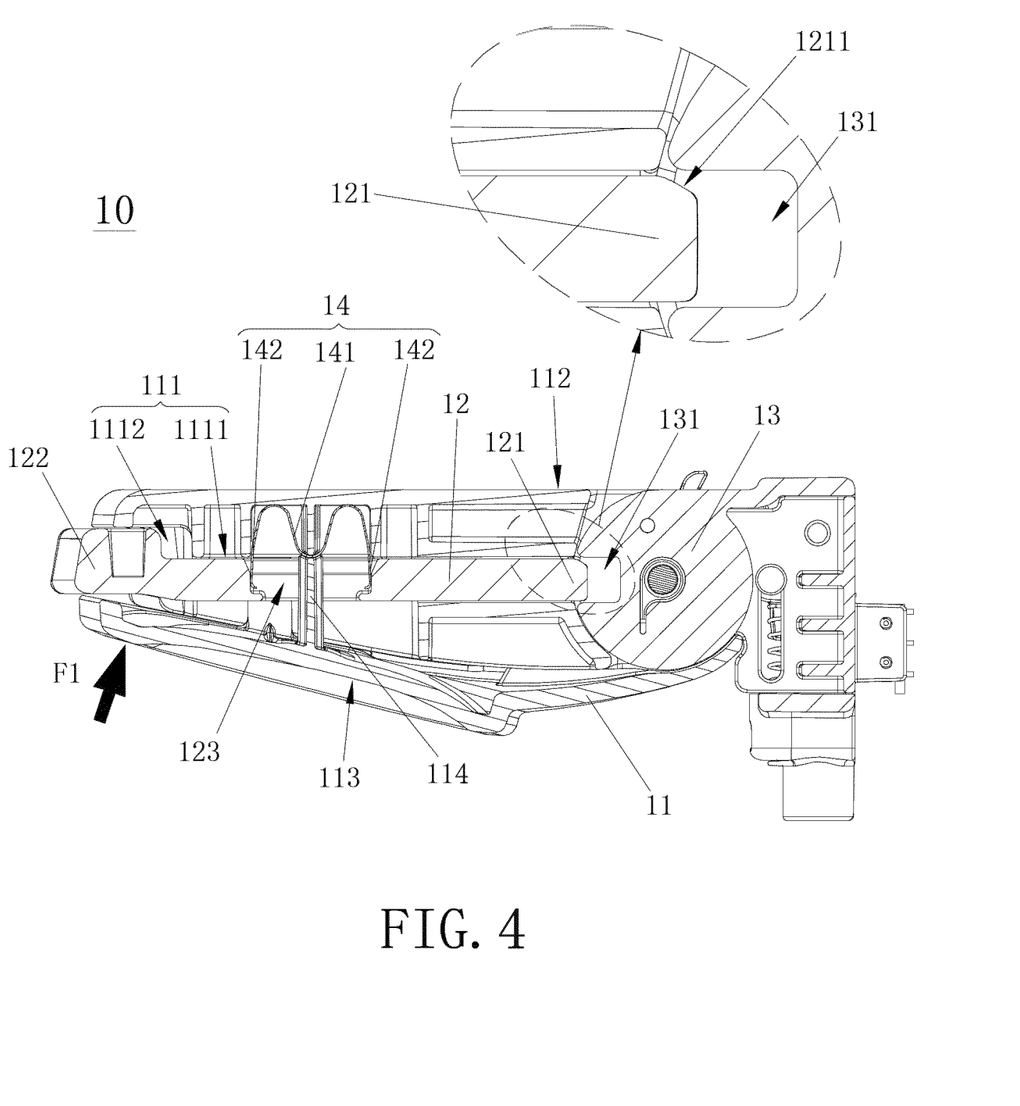
FIG. 4 includes a sectional view taken along line A-A of FIG. 2 and a fragmentary enlarged view thereof.
Figure 5:
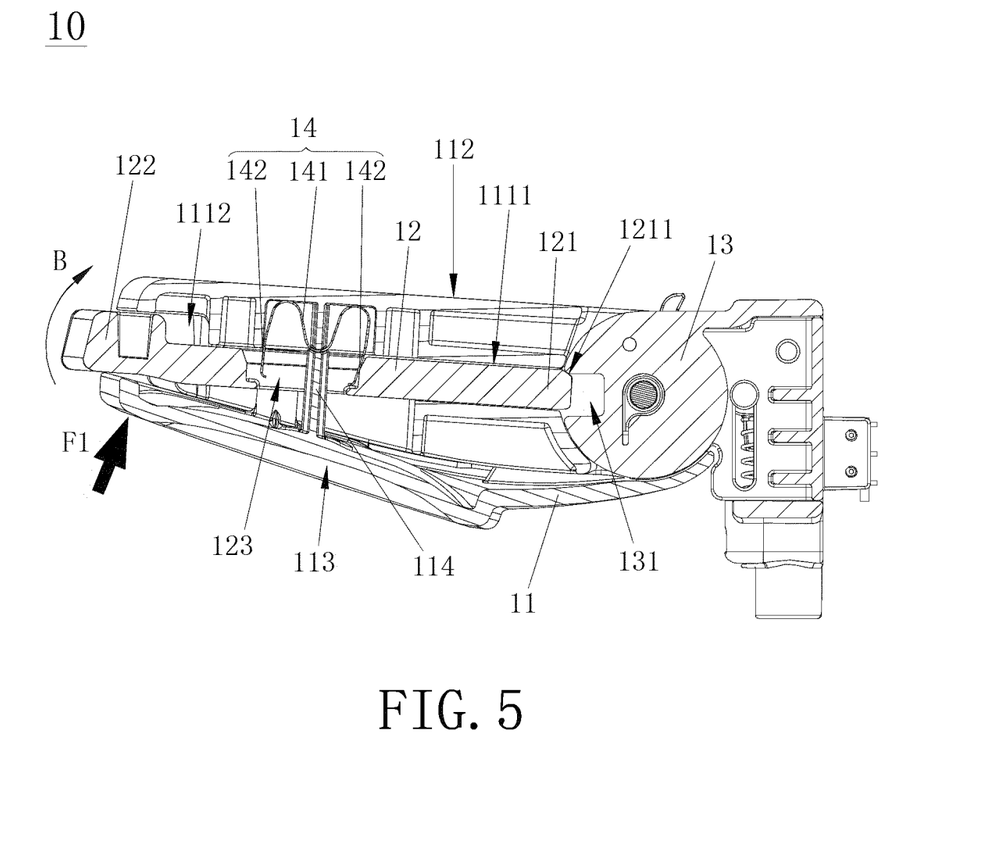
FIG. 5 is a sectional view showing the side collision protection case of FIG. 4 is pushed to turn pivotally.
Figure 6:
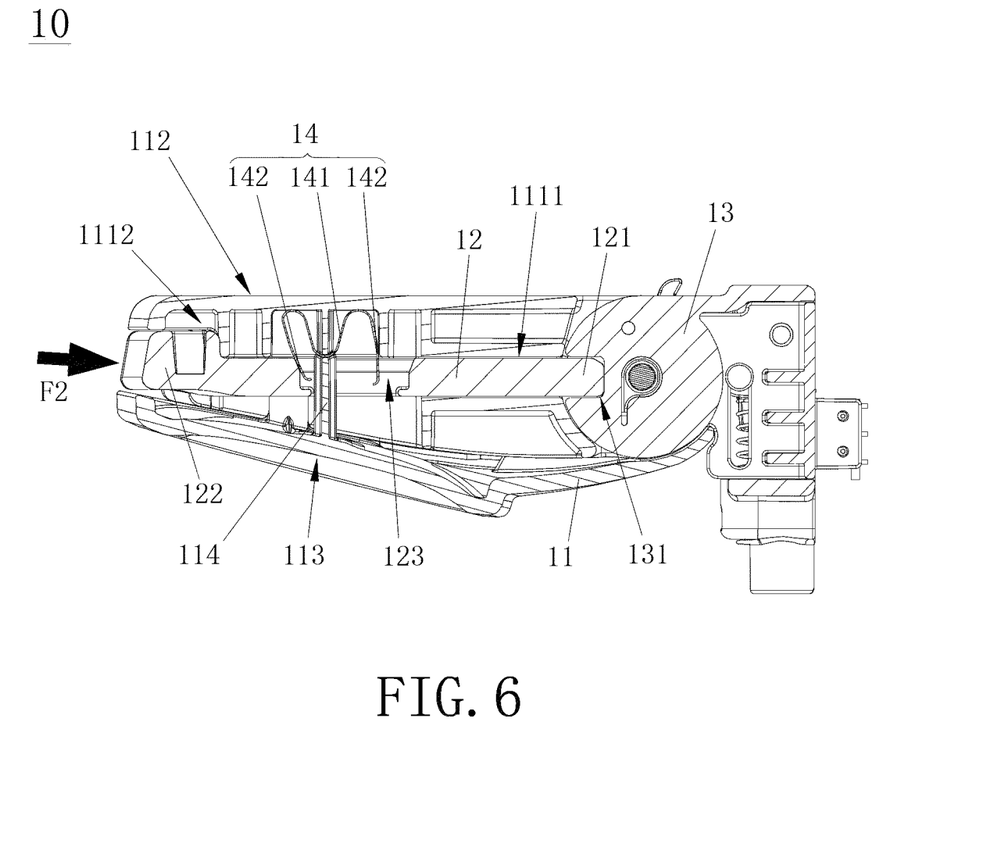
FIG. 6 is a sectional view showing a locking element of the side collision protection mechanism of FIG. 4 is retreated into the side collision protection case with a locking end of the locking element fully locked in place when the child safety seat is subjected to a side impact force.

Please first refer to FIGS. 4 to 6. In addition to the above-mentioned side collision protection case 11, the side collision protection mechanism 10 further includes a locking element 12. The side collision protection case 11 maintains in the extended state through locking of the locking element 12 to the side region 21. The locking element 12 is movably set in the side collision protection case 11 and includes a locking end 121 detachably engaged with the side region 21. When the side collision protection case 11 is in the extended state and subjected to a side impact force, the locking end 121 is fully locked to the side region 21. When the side collision protection case 11 is in the extended state but not subjected to any side impact force, the locking end 121 is partially locked to the side region 21. In the latter case, the side collision protection case 11 can be pushed to pivotally turn relative to the side region 21 to release the locking end 121 from its partial locking to the side region 21, such that the side collision protection case 11 can be switched from the extended state into the folded state. That is, the locking end 121 is fully locked to the side region 21 when the side collision protection case 11 is in the extended state and subjected to a side impact force, such that the side collision protection case 11 is stably maintained in the extended state. The side collision protection mechanism 10 with the above structure ensures its safety use because it provides immediate protection function as soon as a side collision accident occurs. Further, since the locking end 121 is only partially locked to the side regions 21 without being fully locked to the side region 21 when the side collision protection case 11 is in the extended state but not subjected to any side impact force, the side collision protection case 11 can be manually pushed to turn pivotally and release the locking end 121 from its partial locking to the side region 21 completely without the need of operating any unlocking means, which effectively increases the speed of folding the side collision protection mechanism 10 and makes the folding of the side collision protection mechanism 10 more easily and quickly. Also, the side collision protection mechanism 10 of the present disclosure has a further simplified and optimized body structure because it does not include any unlocking means that requires operation. What is to be noted is the term "side impact force" used herein means an impact force applied to a lateral side of the child safety seat 100, which produces a head-on impact on the locking element 12. Specifically, the locking element 12 is slidably set in the side collision protection case 11 and can be conveniently moved to quickly lock to the side region 21 in response to the side impact force in a side collision accident. More specifically, an end of the locking element 12 farther away from the locking end 121 forms an actuating end 122, which is exposed from the side collision protection case 11. When the child safety seat 100 is subjected to a side impact force during a side collision accident, the actuating end 122 of the locking element 12 is the first part that contacts with the sideward impacted car body. At this point, the locking element 12 is immediately axially pushed at the actuating end 122 to retreat into the side collision protection case 11, such that the locking end 121 is fully locked to the side region 21 and the whole side collision protection case 11 is immediately locked to the extended state in response to the side collision to sufficiently ensure the safety use thereof.

As shown in FIGS. 4 to 6, the locking element 12 is arranged to be slidable along a direction the same as a lengthwise extending direction of the side collision protection case 11. When the side collision protection mechanism 10 is subjected to a side impact force in a side collision accident, the side impact force forms a push force F2 acted on the locking element 12 in the slidable direction of the locking element 12, as shown in FIG. 6. This brings the locking element 12 to retreat into the side collision protection case 11 to quickly lock to the side region 21. To be able to respond to side impact forces that possibly come from different directions against the locking element 12, the actuating end 122 of the locking element 12 has a substantially cambered outer end surface. Of course, depending on the actual need in use, the outer end surface of the actuating end 122 can be otherwise a flat end surface or an irregularly curved surface without particular limitation thereto. Preferably, the side collision protection case 11 has a contact surface 112 for flatly contacting with the side region 21, and an inward extended concave push surface 113 located opposite to the contact surface 112. When the side collision protection case 11 is in the folded state, the contact surface 112 is flatly fitted on the side region 21, so that the child safety seat 100 is more compact in structure. To pivotally turn the extended side collision protection case 11 into the folded state, an operator may press his or her palm on the concave push surface 113 to facilitate easy turning of the side collision protection case 11.

Please refer to FIGS. 1, 2, 4 and 6. The side collision protection mechanism 10 of the present disclosure further includes a fixing member 13 fixedly mounted to the child safety seat 100. The fixing member 13 includes a locking recess 131 for detachably engaging with the locking end 121, and the locking of the locking end 121 to the side region 21 is realized through the engagement of the locking end 121 with the locking recess 131. Since the fixing member is an independent device and the locking end 121 is locked to the side region 21 through the engagement of it with the locking recess 131 of the fixing member 13, the fixing member 13 provides the function of preventing the side region 21 from any adverse influence on the structure thereof. Preferably, the locking end 121 only extends into the locking recess 131 by a depth of 3 mm when the side collision protection case 11 is in the extended state and not subjected to any side impact force, such that the locking end 121 is easily detachable from the locking recess 131. It is understood the present disclosure is not particularly limited to the above condition. Depending on the actual need in use, the locking end 121 can be configured to extend deeper into the locking recess 131, such as 5 mm; or to extend less deep into the locking recess 131, such as 2 mm Specifically, the locking element 12 is in alignment with the locking recess 131 when the side collision protection case 11 is in the extended state, so that the locking element 12 can be quickly aligned with and engaged with the locking recess 131 when the side collision protection case 11 is in the extended state. For example, the locking recess 131 can be, but not limited to, a slot; and the locking element 12 can be, but not limited to, a plate or a shaft. More specifically, the locking end 121 is provided at its tip with a beveled structure 1211, which is in alignment with an inner peripheral wall around an opening of the locking recess 131 when the side collision protection case 11 is in the extended state and not subjected to a side impact force. When the side collision protection case 11 is being pivotally turned, the beveled structure 1211 of the locking end 121 is slidably pressed against the inner peripheral wall around the opening of the locking recess 131, allowing the locking end 121 to smoothly release from the partial locking to the locking recess 131 and accordingly, to quickly unlock the locking element 12. The beveled structure 1211 at the tip of the locking end 121 is preferably, but not limited to, 1.5 mm in length. Depending on the actual need in use, the beveled structure 1211 may be otherwise a rounded edge structure formed at the tip of the locking end 121.

Please refer to FIGS. 4 to 6. When the side collision protection case 11 is in the extended state and subjected to a side impact force, an interference fit between the actuating end 122 and the side collision protection case 11 occurs to block the locking element 12 from completely retreating into the side collision protection case 11 and losing its normal function. Specifically, the side collision protection case 11 internally defines a slide passage 111, in which the locking element 12 slides. The locking element 12 is located in the slide passage 111 without the risk of shaking in the side collision protection case 11 to ensure stable and smooth sliding of the locking element 12 in the side collision protection case 11. More specifically, the slide passage 111 includes a first passage section 1111 and a second passage section 1112, which are arranged in a stepped manner. The second passage section 1112 has a bore size larger than that of the first passage section 1111. The second passage section 1112 extends through the side collision protection case 11 with the actuating end 122 of the locking element 12 set in the second passage section 1112. When the side collision protection case 11 is subjected to a side impact force, the actuating end 122 is pressed against an inner wall surface of the second passage section 1112. That is, during a side collision accident, the actuating end 122 is blocked by the inner wall surface of the second passage section 1112 from completely retreating into the side collision protection case 11 to lose its normal function.

As shown in FIGS. 4 to 6, the side collision protection mechanism 10 of the present disclosure further includes a locating assembly 14 mounted on the side collision protection case 11 and coupled to the locking element 12. When the side collision protection case 11 is in the extended state and not subjected to any side impact force, the locating assembly 14 constantly holds the locking element 12 in place in the side collision protection case 11, so that the locking end 121 constantly maintain the partial locking to the side region 21. Therefore, when the side collision protection case 11 is in the extended state and not subjected to any side impact force, the locking element 12 is constantly partially locked to the locking recess 131, which ensures the locking element 12 can be brought by the side collision protection case 11 to quickly release from the engagement with the locking recess 131 and the side collision protection case 11 can be changed from the extended state into the folded state each time the side collision protection case 11 is pivotally pushed to turn pivotally. Specifically, the locating assembly 14 has the tendency of driving the locking element 12 to extend out of the side collision protection case 11 when the locking end 121 is fully locked to the side region 21. That is, each time after a side collision, the locating assembly 14 functions to restore or reset the locking element 12 to the position of extending out of the side collision protection case 11 for convenient use next time. More specifically, the locating assembly 14 includes a mounting section 141 and an elastic section 142 located at an end of the mounting section 141. The elastic section 142 is elastically arranged relative to the mounting section 141, the mounting section 141 is mounted on the side collision protection case 11, and the elastic section 142 is mounted on the locking element 12 in an interference-fit manner. The locating assembly 14 is simple in structure and advantageous for easy mounting. Depending on the actual need in use, the locating assembly 14 can be otherwise a conventionally known spring to similarly realize the locating and the resetting of the locking element 12. Preferably, but not limited to, the mounting section 141 is snap fitted in the side collision protection case 11, such that the locating assembly 14 is firmly mounted in the side collision protection case 11 and can be conveniently mounted thereto or dismounted therefrom. To facilitate easy mounting of the elastic section 142 on the locking element 12 with an interference fit formed between them, the locking element 12 is provided with a connecting bore 123 and the elastic section 142 is elastically pressed against an inner wall surface of the connecting bore 123. However, the present disclosure is not particularly limited thereto. Depending on the actual need in use, the elastic section 142 may be otherwise directly installed on the locking element 12 to similarly realize the locating and resetting of the locking element 12. For example, the locating assembly 14 may otherwise include two elastic sections 142 and be an elastic element arranged like a letter "m". Alternatively, depending on the actual need in use, the locating assembly 14 may be otherwise letter N-shaped or wave-shaped without being particularly limited thereto. To prevent the locking element 12 from completely moving out of the side collision protection case 11, the side collision protection case 11 is internally provided with a locating shaft 114 inserted in and extended through the connecting bore 123.

The working principle of the child safety seat 100 of the present disclosure is hereby explained with reference to FIGS. 1 to 6. When it is desired to fold up the side collision protection case 11, an operator simply pushes the side collision protection case 11 in a direction indicated by the arrow FI in FIG. 4. Since the side collision protection case 11 is initially in the extended state and the locking end 121 of the locking element 12 is only partially engaged with the locking recess 131, the side collision protection case 11 under the push in the direction FI will turn in the direction indicated by the arrow B as shown in FIG. 5 and brings the locking element 12 to turn along with it. The beveled structure 1211 of the locking end 121 pressing against the inner peripheral wall of the opening of the locking recess 131 forces the locking element 12 to extend outward, bringing the locking end 121 to release from the partial engagement with the locking recess 131. After being pivotally turned, the side collision protection case 11 in the extended state as shown in FIG. 2 is therefore switched into the folded state, as shown in FIG. 3.

On the other hand, when it is desired to pull out the side collision protection case 11 for use, an operator simply turns the side collision protection case 11 from the folded state into the extended state. When the side collision protection case 11 is being turned, the locating assembly 14 is deformed and has a tendency of constantly driving the locking element 12 toward the fixing member 13 for the locking end 121 to constantly press against the fixing member 13. When the side collision protection case 11 has been switched into the extended state, the locking element 12 is aligned with the locking recess 131 and no longer blocked by the fixing member 13, and the locating assembly 14 is elastically restored from the deformation to push the locking end 121 to extend into the locking recess 131. Since the locking element 12 is located in place by the locating assembly 14, the locking end 121 is constantly partially engaged with the locking recess 131, which keeps the side collision protection case 11 in the extended state to buffer a side impact force applied to the child safety seat 100.

When the child safety seat 100 is subjected to a side impact force in the direction indicated by the arrow F2 as shown in FIG. 6, the actuating end 122 of the locking element 12 protruded from the side collision protection case 11 is the first part that receives the side impact force. As a result, the locking element 12 is pushed into the side collision protection case 11 and the locking end 121 is brought to completely extend into the locking recess 131 to lock and maintain the side collision protection case 11 in the extended state. Since the side collision protection case 11 functions to buffer the side impact force applied to the child safety seat 100 by the car body during a side collision accident, it ensures the safety use of the child safety seat 100.

It is to be noted that the push of the side collision protection case 11 as mentioned above means the application of a push force to the side collision protection case 11 to pivotally turn the same; and the push force acts in a direction perpendicular to a direction in which the side collision protection case 11 is lengthwise extended.

Compared to the currently available technical means, the side collision protection mechanism 10 of the present disclosure includes a side collision protection case 11 and a locking element 12. The side collision protection case 11 maintains in an extended state through locking of the locking element 12 to a side region 21 of a child safety seat 100. The locking element 12 is slidably set in the side collision protection case 11 and includes a locking end 121 that is detachably engaged with the side region 21. When the side collision protection case 11 is in the extended state and subjected to a side impact force, the locking end 121 is fully locked to the side region 21. On the other hand, when the side collision protection case 11 is in the extended state but not subjected to any side impact force, the locking end 121 is partially locked to the side region 21. In the latter case, when the side collision protection case 11 is pushed to pivotally turn relative to the side region 21, the locking end 121 is brought by the turning side collision protection case 11 to release from the partial locking to the side region 21, which ensures the side collision protection case 11 to be switched from the extended state into a folded state. Since the locking end 121 is fully locked to the side region 21 when the side collision protection case 11 is in the extended state and subjected to a side impact force, the side collision protection case 11 can be stably kept in the extended state. This means the side collision protection mechanism 10 can quickly provide its buffer effect as soon as a side collision occurs to ensure the safety use thereof. On the other hand, since the locking end 121 is only partially locked to the side region 21 when the side collision protection case 11 is in the extended state but not subjected to any side impact force, the side collision protection case 11 can be manually pushed to turn pivotally and bring the locking end 121 to release from the partial locking to the side regions 21 completely without the need of operating any unlocking means. This effectively increases the speed of folding the side collision protection mechanism 10, making the folding of the side collision protection mechanism 10 more easily and quickly. Further, since the side collision protection mechanism 10 of the present disclosure does not includes any unlocking means that needs an operator to operate, the side collision protection mechanism 10 can have an effectively optimized and simplified structure.

It can be understood the child safety seat 100 provided with the side collision protection mechanism 10 of the present disclosure also has the same technical effect as the side collision protection mechanism 10.

While the present disclosure has been described by means of a specific embodiment, numerous modifications and variations could be made thereto by persons skilled in the art without departing from the scope and spirit of the present disclosure set forth in the claims.

What is claimed is:

1. A side collision protection mechanism for buffering a side impact force applied to a child safety seat during a side collision accident, comprising:
a side collision protection case and a locking element; the side collision protection case being pivotally turnably connected to a side region of a child safety seat to be switched between a folded state, in which the side collision protection case is flatly fitted on the side region, and an extended state, in which the side collision protection case is turned away from the side region; the side collision protection case being maintained in the extended state through a locking of the locking element to the side region; the locking element being movably set in the side collision protection case and having a locking end detachably engaged with the side region; the locking end being fully locked to the side region when the side collision protection case is in the extended state and subjected to a side impact force; the locking end being partially locked to the side region when the side collision protection case is in the extended state but not subjected to any side impact force; and the locking end being brought to release from the partial locking to the side region when the side collision protection case in the extended state and not subjected to any side impact force is pushed to pivotally turn relative to the side region to switch from the extended state into the folded state.

2. The side collision protection mechanism according to claim 1, wherein the locking element is slidably set in the side collision protection case.

3. The side collision protection mechanism according to claim 1, wherein an end of the locking element far away from the locking end is an actuating end, and that the actuating end is exposed from the side collision protection case.

4. The side collision protection mechanism according to claim 3, wherein the actuating end has a substantially cambered outer end surface.

5. The side collision protection mechanism according to claim 1, further comprising a fixing member fixedly mounted to the child safety seat; the fixing member including a locking recess for detachably engaging with the locking end; and the locking of the locking end to the side region being realized through the engagement of the locking end with the locking recess.

6. The side collision protection mechanism according to claim 5, wherein the locking element is in alignment with the locking recess when the side collision protection case in the extended state.

7. The side collision protection mechanism according to claim 5, wherein the locking end has a tip provided with a beveled structure, and the beveled structure being m alignment with an inner peripheral wall around an opening of the locking recess when the side collision protection case is in the extended state and not subjected to a side impact force.

8. The side collision protection mechanism according to claim 5, wherein the locking recess is a slot.

9. The side collision protection mechanism according to claim 3, wherein an interference fit between the actuating end and the side collision protection case occurs when the side collision protection case is in the extended state and subjected to a side impact force.

10. The side collision protection mechanism according to claim 3, wherein the side collision protection case internally defines a slide passage, and the locking element being slidably set in the slide passage.

11. The side collision protection mechanism according to claim 10, wherein the slide passage includes a first passage section and a second passage section, which are arranged in a stepped manner, such that the second passage section has a bore size larger than that of the first passage section; and the second passage section extending through the side collision protection case with the actuating end set in the second passage section.

12. The side collision protection mechanism according to claim 1, wherein the locking element is arranged to be slidable along a direction the same as a lengthwise extending direction of the side collision protection case.

13. The side collision protection mechanism according to claim 1, further comprising a locating assembly mounted on the side collision protection case and connected to the locking element; the locating assembly constantly holding the locking element m place in the side collision protection case when the side collision protection case is in the extended state and not subjected to any side impact force, such that the locking end is constantly maintained in its partial locking to the side region.

14. The side collision protection mechanism according to claim 13, wherein the locating assembly has a tendency of driving the locking element to extend out of the side collision protection case when the locking end is fully locked to the side region.

15. The side collision protection mechanism according to claim 13, wherein the locating assembly includes a mounting section and an elastic section located at an end of the mounting section; the elastic section being elastically arranged relative to the mounting section, the mounting section being mounted on the side collision protection case, and the elastic section being mounted on the locking element in an interference-fit manner.

16. The side collision protection mechanism according to claim 15, wherein the locking element is provided with a connecting bore, and the elastic section being pressed against an inner wall surface of the connecting bore.

17. The side collision protection mechanism according to claim 16, wherein the side collision protection case is internally provided with a locating shaft, and the locating shaft being inserted in and extended through the connecting bore.

18. The side collision protection mechanism according to claim 13, wherein the locating assembly is an elastic element arranged like a letter "m".

19. The side collision protection mechanism according to claim 1, wherein the side collision protection case has a contact surface for flatly contacting with the side region, and an inward extended concave push surface located opposite to the contact surface.

20. A child safety seat, comprising:
a seat, a base and a side collision protection mechanism;

the side collision protection mechanism being one according to claim 1; the seat being mounted on a top of the base; and a side collision protection case of the side collision protection mechanism being pivotally connected to a side region of the seat or the base.

* * * * *